United States Patent [19]

Danton et al.

[11] Patent Number: 4,900,201

[45] Date of Patent: Feb. 13, 1990

[54] DRILL SPINDLE DEPTH ADJUSTMENT

[75] Inventors: John L. Danton, Endicott; Albert F. Klaiber, III, Chenango Forks; Richard A. Terboss, Binghamton, all of N.Y.

[73] Assignee: International Business Machines Corp., Armonk, N.Y.

[21] Appl. No.: 318,880

[22] Filed: Mar. 6, 1989

[51] Int. Cl.[4] .............................. B23B 41/00
[52] U.S. Cl. .............................. 408/129; 408/234; 408/241 S; 409/184
[58] Field of Search ............... 409/184, 231; 408/31, 408/14, 202, 241 S, 4, 15, 129, 234

[56] References Cited

U.S. PATENT DOCUMENTS

| | | | |
|---|---|---|---|
| 1,305,872 | 6/1919 | Bollie | 408/241 S |
| 2,301,151 | 11/1942 | Spievak | 408/112 |
| 2,359,859 | 10/1944 | Jarvis . | |
| 2,402,353 | 6/1946 | Trautmann . | |
| 2,710,549 | 6/1955 | Cogsdill . | |
| 2,908,978 | 10/1959 | Knosp et al. . | |
| 3,178,969 | 4/1965 | Yogus et al. . | |
| 3,347,115 | 10/1967 | Koch . | |
| 3,357,280 | 12/1967 | Holloway et al. | 408/14 |
| 3,400,616 | 9/1968 | Mihic . | |
| 3,460,408 | 8/1969 | Raymond . | |
| 3,677,560 | 7/1972 | Clarkson | 279/47 |
| 3,844,672 | 10/1974 | Fitzsimmons | 408/155 |
| 3,911,542 | 10/1975 | Friedline et al. | 29/96 |
| 4,115,017 | 9/1978 | Wilhelmsson | 408/14 |
| 4,351,467 | 9/1982 | White | 408/14 |
| 4,436,462 | 3/1984 | Martinez | 408/14 |
| 4,557,646 | 12/1985 | Biek | 408/14 |
| 4,592,257 | 6/1986 | Durr | 81/429 |
| 4,619,564 | 10/1986 | Jacobson | 408/146 |
| 4,813,822 | 3/1989 | Biek | 408/14 |

FOREIGN PATENT DOCUMENTS

1122347  1/1962  Fed. Rep. of Germany .

*Primary Examiner*—Daniel Howell

[57] ABSTRACT

A drilling device for drilling blind holes to a preselected depth in a work piece is provided. The drilling device includes a drill which rotatably drives a spindle which spindle drives a drill bit. Guide means for mounting the drill member for axial movement to perform the drilling operation are provided. A rod member is secured to and extends from the drill member and is moveable axially therewith as the drill performs its drilling function. An adjustable member is threadably mounted on the rod and is moveable relatively axially on the rod. Adjusting means including a wheel and detent are provided which are connected to the adjustable member and the rod member to rotate the adjustable member with respect to the rod member to thereby cause relative axial movement of the rod member and adjustable member which will change the relative position of the adjustable member on the rod member. Actuating means are also provided which are selectively connectable to the adjustable member to reciprocally drive the adjustable member between a retracted position and a fully actuated position to thereby provide a drive actuation for the drill. Hence the relative movement of the adjustable member, the rod member will change the fully actuated position of the drill bit upon actuation irrespective of the position of the actuating member.

12 Claims, 4 Drawing Sheets

DRILL SPINDLE DEPTH ADJUSTMENT

BACKGROUND OF THE INVENTION

Field of the Invention

This invention relates generally to the drilling of holes to a preselected depth, and more specifically to a drill which is utilized for drilling blind holes and which can be adjusted to provide the precise depth of drilling wherein the adjustment can be done externally of the tool and independent of the stroke of the mechanism doing the drilling.

There are many instances where controlled depth of drilling needs to be performed. One specific technology in which controlled depth drilling is required is in the drilling of blind holes in substrate material for the packaging of semi-conductor chips. In this particular technology, a multi-layer circuit board is provided having various levels of circuitry which require vias of different depths to connect with different levels of circuitry.

It has been conventional prior art practice to provide a series or gang of drills operated by a common arm to drill to the desired depth. The conventional practice for adjusting the depth is to provide a very rough adjustment of the depth by means of screwing the drills onto a support collar on a frame and then providing a fine or final adjustment of each drill by adjusting the depth of the socket in the spindle into which the drill bit is to be inserted. Conventionally a set screw or some other type of recessed screw is provided at the end of the socket. In this case, the drill must be completely removed from the set up and this depth screw changed and the drill reinserted to provide for the fine adjustment of the depth of drilling.

When a series of drills are used, there may be frequent requirements for fine adjustment due to various factors during the drilling operation which necessitates frequent down time with excessive delays in removing the specific drill involved, removing the drill bit and adjusting the socket and then reassembling the drill into the rig during which time all drilling is suspended. Thus, it has become desirable to provide a drill which can be very quickly and easily fine adjusted externally without dismantling the drill from its support frame to provide final and precise adjustment of the depth to which drilling takes place.

There have been many prior art devices which in various manners provide for adjustment of depth of drilling. These include U.S. Pat. Nos. 4,619,564 4,557,646; 4,592,257; 4,115,017; 4,436,462; 3,911,542; 3,677,560; 3,460,408; 3,400,616; 2,908,978; 2,710,549; 2,402,353; 2,359,859; 2,301,151; 3,347,115; 3,844,672; and 3,178,969. While these patents show various techniques for adjusting the depth of drilling, nevertheless none of them teaches or suggests the specific structure wherein an external adjustment can be quickly made on a drill bit without removing it from the rig and the depth adjusted irrespective of the length of the stroke of the actuating structure.

Summary of the Invention

According to the present invention, a drilling device for drilling blind holes to a preselected depth in a work piece is provided. The drilling device includes a drill member rotatably driving a spindle which spindle secures a drill bit. Guide means for mounting the drill member for axial movement to perform a drilling operation are provided. A rod member is secured to and extends from said drill member and is movably axially therewith as the drill performs its drilling operation. An adjustable member is threadably mounted on said rod member to provide relative axial movement of said rod member and said adjustable member upon rotation of said adjustment member. Adjusting means are provided connected to the adjustable member and the rod member to rotate the adjustable member with respect to the rod member to thereby cause said relative axial movement of the rod member and the adjustable member. Actuating means are also provided which are connectable to the adjustment member to reciprocally drive said adjustable member between a retracted position and a fully actuated position to thereby provide drive actuation for the drill. Hence, the relative movement of the adjustable member and the rod member will change the fully actuated position of the drill bit upon actuation irrespective of the position of the actuating member.

DESCRIPTION OF THE PREFERRED EMBODIMENT

Figure 1:
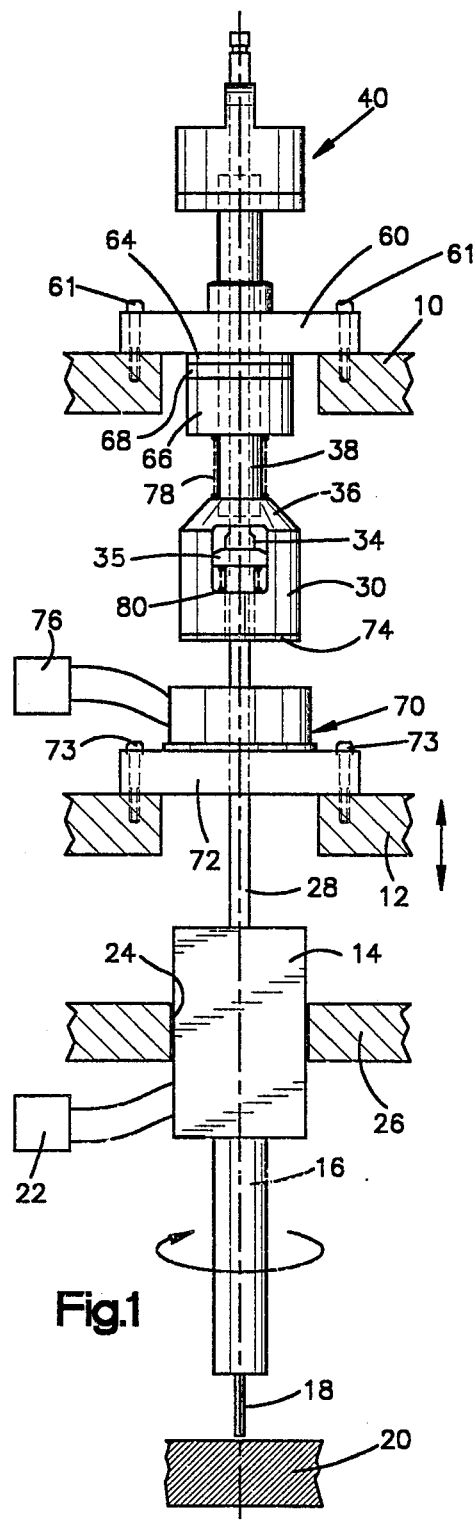
FIG. 1 is a side elevational view partially in section showing a device according to this invention in a non-drilling actuated position.
Figures 2, 3:
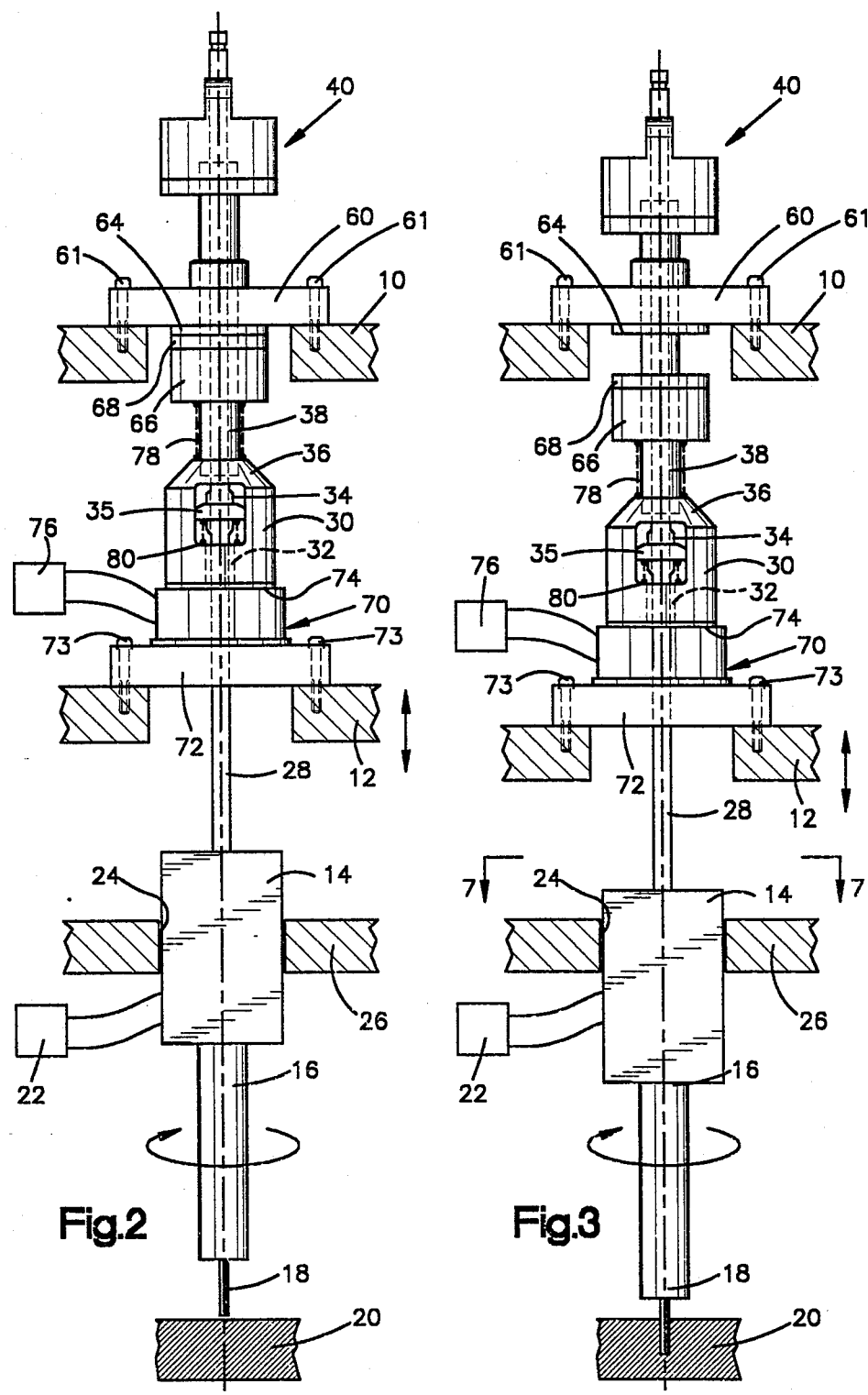
FIG. 2 is a side elevational view partially in section similar to FIG. 1 showing the device of this invention in the retracted position.
FIG. 3 is a side elevational view partially in section similar to FIGS. 1 and 2 showing the device in a drilling actuated position.

Referring now to the drawing and for the present FIGS. 1 through 3, one embodiment of the present invention is shown. The present invention is especially adapted to be utilized as a part of a series of drills all carried by a single frame member, a portion of which is shown and designated as 10. Only one drill is shown in the drawing, it being understood, however, that many other drills can and normally would be secured to the frame member 10. Frame member 10 normally also mounts an actuating arm 12 which oscillates up and down as indicated by the arrows in FIGS. 1 through 3 to selectively drive the drill from a retracted position to an actuated position as will be described presently. A single actuating arm with a specifically controlled stroke length is utilized to drive all of the drills. The adjustment of the depth of drilling for each drill thus has to be independent from the actuating arm and the frame 10 and be provided for in each individual drill mechanism or assembly itself.

Figure 7:
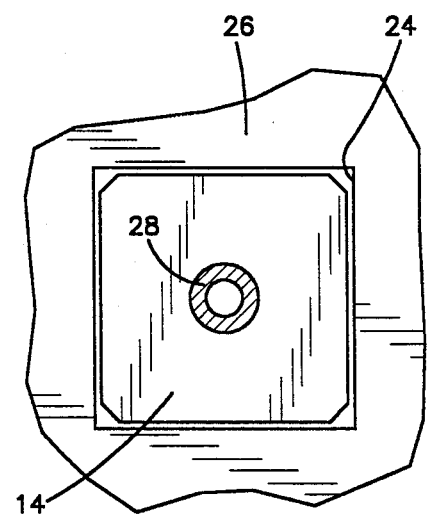
FIG. 7 is a sectional view taken substantially along the plane designated by the Line 7-7 of FIG. 3.

Each of the drill assemblies includes a drill member 14 which rotatably drives a spindle 16 which in turn mounts a drill bit 18 in an end chuck not shown. The drill is adapted to drill blind holes into a work piece 20 and typically each one of the drills which are mounted on the frame may have to drill holes to a different depth. The drill member 14 may be operated by any conventional means, a preferred type of drill being an air operated drill which is operated by required air and controls designated by the box 22. No particular type of drill and operation thereof is critical, various types of drills being perfectly suitable for use in this particular invention. The drill member 14 is rectangular in shape and mounted for axial movement in a rectangular opening 24 of a drill guide 26 carried by the frame member as can best be seen in FIG. 7.

The drill member 14 has a rod member 28 secured thereto and extending axially from the end thereof opposite the spindle. The rod 28 is moveable axially with the drill member 14 in the opening 24. A generally cylindrically hollow adjustment member 30 is provided which has threads 32 threadably engaging threads 34 on the rod member 28. A lug member 35 is also threadably engaged with threads 34 for a purpose which will be described presently. The adjustable member 30 has a tapering upper surface 36 which terminates in a hollow stem 38 projecting upwardly therefrom.

An adjusting member 40 is provided at the end of the rod opposite the drill member 14. As can best be seen in FIGS. 5 and 6, the adjusting member 40 includes a knob 42 which is rigidly secured to the hollow stem 38 of the adjustable member 30. The adjusting member 40 also includes a cylindrical tooth member 44 having a plurality of circumferencially spaced teeth 46 spaced therearound. The cylindrical member 44 is secured to the rod 28 by means of a set screw 48 and thus is non-rotative with respect thereto. The knob 42 is provided with a spring detent 50 which includes a V-portion 52 positioned to coact with the teeth 46, the detent 50 being secured to the cover by means of a set screw 54. Thus, it can be seen that by rotating the knob 42, the adjustable member 30 will also rotate therewith since the knob 42 is secured to the hollow stem 38 of the adjustable member 30; and, if the rod 28 is maintained stationary as it will be by virtue of the coaction of the rectangular drill 14 and rectangular slot 24, rotation of the knob 42 will cause the adjustable member 30 to move axially relative to the rod 28 by virtue of its threaded engagement to the rod 28 as shown at 34. It should also be noted that because of the detent and tooth wheel construction, incremental movement of the adjustable member 30 with respect to the rod 28 can be accomplished in specific increments depending upon the pitch of the threads at 34 and the spacing of the teeth 46. The purpose of this adjustment will become apparent presently.

Figure 4:
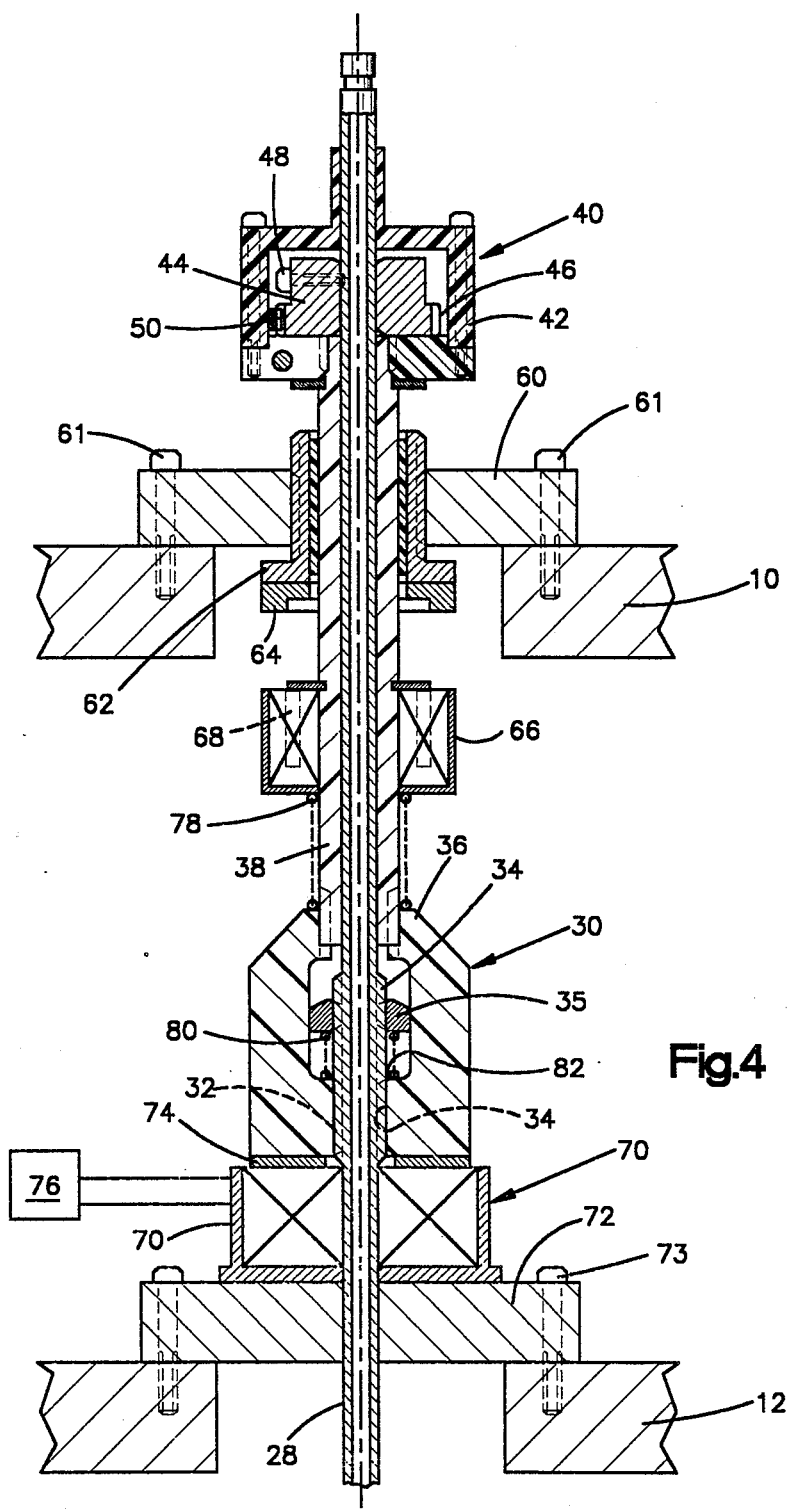
FIG. 4 is an enlarged longitudinal sectional view of the portion of the device as shown in FIG. 3.

Referring again to FIGS. 1 through 4, a mounting jig 60 is provided for mounting the drill assembly to the frame 10, the mounting jig 60 being secured to the mounting frame by screws 61. As can best be seen in FIG. 4, hollow bushing 62 is threadably engaged into the jig 60 which bushing slidably mounts the hollow stem 38 of the adjustable member 30 therein. The lower end of the bushing 62 is provided with a ring of ferro magnetic material 64 such as steel, iron or other magnetizable metal or material. The bushing 62 can be moved vertically within the jig 60 by means of its threaded interconnection and therefore can be moved up and down within the jig 60 and thus be adjusted with respect to its position vis-a-vis to the stationary frame 10 to provide a coarse of rough adjustment of the drilling depth. A collar 66 is secured to the hollow stem 34 of the adjustment member 30 and is provided with a permanent magnet ring 68 at the top thereof which is adapted to coact with the ferro magnetic ring 64 of the bushing 62.

An electromagnet 70 slidably engages the rod 28 and is secured to a mounting plate 72 which in turn is secured by screws 73 to the actuating arm or moveable arm 12 of the drilling rig. The bottom of the adjustable member 30 has secured thereto a ring of ferro magnetic material such as steel, or iron or nickel or the like. Suitable controls designated by the rectangle 76 for operating the electromagnet are provided, the sequence of operation of which will be described presently. A spring 78 is interposed between the collar 66 and the upper surface 36 of the adjustable member 30, and a spring 80 is interposed between the central lug 35 and the bottom surface 82 on the interior of the adjustable member 30. These springs are to provide stability of the various components and compensate for dimensional tolerances of the threads of the adjusting device for the drill during adjustment and the drilling operation.

The operation of the drilling device is as follows:

As indicated above, normally a whole series of drilling devices are mounted on a stationary frame 10 by means of the jig 60 and mounting bushings 62. A coarse or preliminary adjustment of the vertical portion of the drill with respect to the work piece can be made by positioning of the bushing 62 in the jig 60. The permanent magnet 68 acting against the ferro magnetic ring 64 normally maintains the adjustable member 30 in the position as shown in FIGS. 1 and 2. Also the electro magnet 70 is normally maintained in the de-energized or off position; thus the rotating drill bit 18 is maintained above and out of contact with the work piece 20 by the action of the magnet 68 against ring 64. This is true for all of the drills which are mounted on the frame 10.

The moveable arm 12 oscillates up and down as indicated by the arrows in FIGS. 1, 2 and 3. However, when the electromagnet 70 is off, the oscillation of the arm 12 will have no effect on the ferro magnetic ring 74 secured to the underside of the adjustment member 30 and thus the oscillation will have no effect on moving the drill member 14 up or down since the rod 28 will be unmoved, the arm 12 moving between the position shown in FIGS. 1 and 2.

As the work piece 20 is moved into position under the group of drills and it is desired to drill a hole at any specific location, the electro magnet 70 is actuated or energized by means of the controls 76 such that when it reaches the position in FIG. 2 the electro magnet will immediately attract the ferro magnetic ring 74. The strength of the electro magnet 70 and the composition of the ring 74 are selected such that the electromagnet 70 will exert a greater force on the ferro magnetic material 74 than the permanent magnetic material 68 exerts on the ferro magnetic ring 64. Thus, when the oscillating arm moves down from the position shown in FIG. 2 to the position shown in FIG. 3, it will carry the adjustable member 30 with it overcoming the magnetic attraction of the magnetic ring 68 for the ferro magnetic ring 64. Since the adjustment member 30 is secured to the rod 28 by the threaded engagement thereof to the threads 34, the central rod 28 will also move down moving the drill 14 downwardly thus causing the bit 18 to move downwardly and drill a hole in the work piece 20. The drilling continues until the bottom of the stroke of the arm 12 has been reached at which time the moveable arm will be reversed and returned to the position as shown in FIG. 2 and the electromagnet 70 de-energized.

Figure 5:
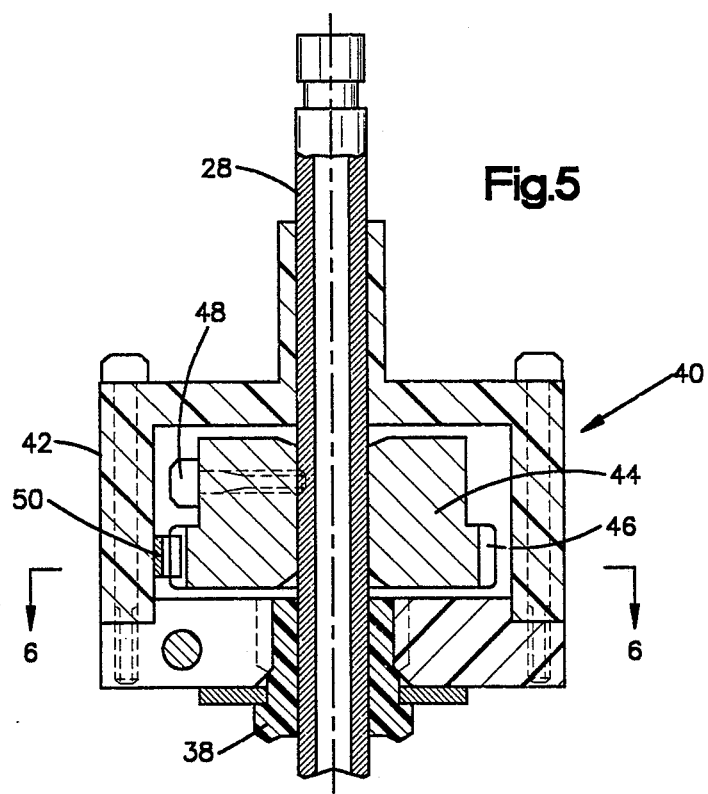
FIG. 5 is an enlarged longitudinal sectional view of the adjusting mechanism of the device.
Figure 6:
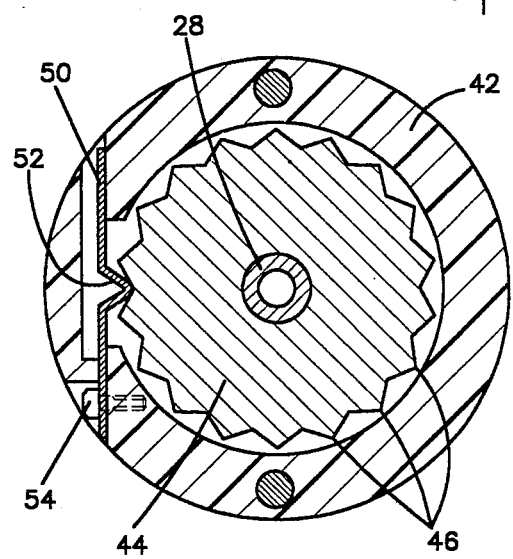
FIG. 6 is a sectional view taken substantially along the plane designated by Line 6-6 of FIG. 5.

The depth to which the drill 18 will drill a hole is dependent upon the amount of movement of the drill 14 which in turn is dependent upon the length of movement of the adjustable member 30 as it is being driven downwardly by the actuating arm 12. This length of movement is in turn a function of the distance between the bottom of the ferro magnetic ring 74 at the position as shown in FIG. 1 and the bottom of the stroke of the moveable arm 12. Since the distance of travel of the arm 12 is fixed, the depth is adjusted by moving the relative position of the adjustable member 30 in its position shown in FIG. 1. This is accomplished by rotating the knob 42 of the adjusting member 40 as can be seen in FIGS. 5 and 6. Rotation of the knob 42 in one direction will move the adjustable member 30 axially with respect to the rod 28 in one direction a distance which is a function of the spacing of the teeth 46 and the pitch of the threads 34; conversely rotation in the opposition direction will move the adjustable member 30 in the opposite direction on rod 28. Thus, by rotating the knob 42 the adjustable member 30 also rotates causing rod 28 to move up and down incrementally a small amount with respect to the position of the bottom of the frame 10 and thus change incrementally the location from which the rod 28 starts its downward motion. By changing the location from which the rod 28 starts its downward motion, the depth to which the drill bit 18 penetrates will be changed since the amount of movement of the moveable arm 12 remains constant. Another advantage of this invention allows for incremental adjustment of each drill in response to many factors which may cause a change in depth of drilling. For example, cam wear, and other machine wear may change the relationship of the frame member 10 and arm 12 over a period of time. This invention provides for adjustment for this wear in an expeditious manner.

While one embodiment of the invention has been shown and described with some degree of particularity, various adaptations and modifications can be made without departing from the scope of the invention as defined in the appended claims.

What is claimed is:

1. In a drilling device for drilling blind holes to a preselected depth in a work piece, which drilling device has a drill member rotatably driving a spindle, which spindle secures a drill bit, a mechanism for adjusting the depth to which a hole is drilled comprising, guide means mounting said drill member for axial movement to perform a drilling operation;

a rod member secured to and extending from said drill member and movable axially therewith, an adjustable member mounted on said rod member and selectively movable thereon to provide relative axial movement of said rod member and said adjustable member, adjusting means connected to said adjustable member and said rod member to move said adjustable member with respect to said rod member to thereby cause said relative axial movement of said rod member and said adjustable member, and actuating means connectable to said adjustable member to reciprocally drive said adjustable member between a retracted position and a fully actuated position to thereby provide drive actuation for said rod member, whereby relative movement of the adjustable member and the rod member changes the fully actuated position of said drill bit upon actuation.

2. The invention as defined in claim 1 wherein said adjusting means includes detent means to move said rod member and said adjustable member at preselected incremental distances.

3. The invention as defined in claim 1 wherein said adjustable member is threadably mounted on said rod.

4. The invention as defined in claim 3 wherein said adjustable member includes a hollow stem wherein said rod member is mounted within said hollow stem for axial movement therein.

5. The invention as defined in claim 1 further characterized by a stationary frame member, a bushing mounted on said stationary frame member, said bushing slidably mounting said adjustable member for axial movement with respect thereto.

6. The invention as defined in claim 5 further characterized by said actuating means including an arm member reciprocally moveable with respect to said stationary frame member, and means carried by said movable arm member and selectively coactable with said adjustable member to selectively engage said adjustable member responsive to movement of the moveable arm member.

7. The invention as defined in claim 6 wherein said means carried by said moveable arm member includes electro-magnetic means selectively energizeable and ferro magnetic means carried by said adjustable member coactable with said electro magnet.

8. The invention as defined in claim 7 further characterized by permanent magnetic means carried by said adjustable member and ferro magnetic means carried by said bushing and positioned to normally maintain the actuating means in contact with said bushing when said electromagnetic means is non-energized;

said electro-magnetic means having greater force when energized than the permanent magnet.

9. The invention as defined in claim 1 wherein there are a plurality of drilling devices secured to common actuating means.

10. The invention as defined in claim 3 further characterized by means interposed between said rod and said adjustable member for compensating for dimensional tolerances of said threaded mounting.

11. The invention as defined in claim 10 wherein said means for compensating for dimensional tolerances of said threaded mounting including lug means mounted on said rod, and spring means interposed between adjustable member and said lug means.

12. The invention as defined in claim 11 wherein said lug means is threadably mounted on said rod member.

* * * * *